United States Patent
Jaipuria et al.

(10) Patent No.: US 10,949,684 B2
(45) Date of Patent: Mar. 16, 2021

(54) VEHICLE IMAGE VERIFICATION

(71) Applicant: Ford Global Technologies, LLC, Dearborn, MI (US)

(72) Inventors: Nikita Jaipuria, Union City, CA (US); Gautham Sholingar, Sunnyvale, CA (US); Vidya Nariyambut Murali, Sunnyvale, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 85 days.

(21) Appl. No.: 16/406,466

(22) Filed: May 8, 2019

(65) Prior Publication Data

US 2020/0356790 A1 Nov. 12, 2020

(51) Int. Cl.
*G06K 9/00* (2006.01)
*G06T 7/593* (2017.01)
(Continued)

(52) U.S. Cl.
CPC ....... *G06K 9/00805* (2013.01); *G05D 1/0221* (2013.01); *G05D 1/0251* (2013.01);
(Continued)

(58) Field of Classification Search
CPC ............. G06K 9/00805; G06K 9/6255; G05D 1/0251; G05D 1/0221; G05D 2201/0213;
(Continued)

(56) References Cited

U.S. PATENT DOCUMENTS

| 2014/0285623 A1 | 9/2014 | Bruls |
| 2017/0091946 A1 | 3/2017 | Wang et al. |

(Continued)

FOREIGN PATENT DOCUMENTS

| CN | 108205803 A | 6/2018 |
| CN | 108564611 A | 9/2018 |
| CN | 109166144 A | 1/2019 |

OTHER PUBLICATIONS

Bousmalis et al., "Unsupervised Pixel-Level Domain Adaptation with Generative Adversarial Networks", arXiv:1612.05424v2; Aug. 23, 2017.

(Continued)

*Primary Examiner* — Dhaval V Patel
(74) *Attorney, Agent, or Firm* — Frank A. MacKenzie; Bejin Bieneman PLC (57) ABSTRACT

A computer, including a processor and a memory, the memory including instructions to be executed by the processor to generate a pair of synthetic stereo images and a corresponding synthetic depth map with an image synthesis engine wherein the synthetic stereo images correspond to real stereo images acquired by a stereo camera and the synthetic depth map is a three-dimensional (3D) map corresponding to a 3D scene viewed by the stereo camera and process each image of the pair of synthetic stereo images pair independently using a generative adversarial network (GAN) to generate a fake image, wherein the fake image corresponds to one of the synthetic stereo images. The instructions can further include instructions to process a stereo pair of fake images to form a fake depth map, compare the fake depth map to the synthetic depth map using a Siamese one-shot neural network, train a deep neural network to determine an object using one or more of the fake images generated by the GAN, and operate a vehicle based on the object.

20 Claims, 6 Drawing Sheets

(51) Int. Cl.
*G06T 11/00* (2006.01)
*G06K 9/62* (2006.01)
*G05D 1/02* (2020.01)

(52) U.S. Cl.
CPC ............ *G06K 9/6255* (2013.01); *G06T 7/593* (2017.01); *G06T 11/001* (2013.01); *G05D 2201/0213* (2013.01); *G06T 2207/10012* (2013.01); *G06T 2207/10028* (2013.01); *G06T 2207/20081* (2013.01); *G06T 2207/20084* (2013.01); *G06T 2207/30261* (2013.01)

(58) Field of Classification Search
CPC ................... G06T 7/593; G06T 11/001; G06T 2207/10028; G06T 2207/30261; G06T 2207/10012; G06T 2207/20084; G06T 2207/20081
See application file for complete search history.

(56) References Cited

U.S. PATENT DOCUMENTS

| | | | |
|---|---|---|---|
| 2018/0059679 | A1 | 3/2018 | Taimouri et al. |
| 2019/0147582 | A1* | 5/2019 | Lee ......................... G06T 11/00 382/156 |
| 2020/0090359 | A1* | 3/2020 | Pillai ........................ G06T 7/75 |
| 2020/0311136 | A1* | 10/2020 | Jun ....................... H04W 4/185 |
| 2020/0312042 | A1* | 10/2020 | Sardari .................... G06T 7/50 |

OTHER PUBLICATIONS

Jaiswal et al., "CapsuleGAN: Generative Adversarial Capsule Network", arXiv:1802.06167v2; Oct. 2, 2018.

Wang et al., "High-Resolution Image Synthesis and Semantic Manipulation with Conditional GANs", arXiv:1711.11585v2; Aug. 20, 2018.

* cited by examiner

VEHICLE IMAGE VERIFICATION

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Vehicles can be equipped to operate in both autonomous and occupant piloted mode. By a semi- or fully-autonomous mode, we mean a mode of operation wherein a vehicle can be piloted partly or entirely by a computing device as part of an information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire data regarding the external environment of a vehicle and to use the data to determine a vehicle path upon which to operate a vehicle in autonomous or semi-autonomous mode. A vehicle can operate on a roadway based on a vehicle path by determining commands to direct the vehicle's powertrain, braking, and steering components to operate the vehicle so as to travel along the path. The data regarding the external environment can include the location of one or more moving objects such as vehicles and pedestrians, etc., in an environment around a vehicle and can be used by a computing device in the vehicle to operate the vehicle.

Operating a vehicle based on moving object data can include determining a vehicle path that avoids moving objects. Predicting a path for moving objects that includes future locations for moving objects can permit a computing device to determine a vehicle path that avoids moving objects. A computing device can operate a vehicle by training a deep neural network (DNN) included in the vehicle to predict a future location for a moving object. The computing device can determine a vehicle path upon which to operate the vehicle that avoids the moving object based on the predicted future location. Techniques discussed herein can improve training the DNN by creating large numbers (>1000) of training images generated by adding atmospheric effects to synthetic images. Using a large dataset of training images that include many different examples of each type of moving objects and many different examples of atmospheric effects can make the DNN more robust, where robust means that a DNN is likely to correctly identify and locate examples of moving objects in previously unseen real world input images.

A method, comprising generating a pair of synthetic stereo images and a corresponding synthetic depth map with an image synthesis engine wherein the synthetic stereo images correspond to real stereo images acquired by a stereo camera and the synthetic depth map is a three-dimensional (3D) map corresponding to a 3D scene viewed by the stereo camera and processing each image of the pair of synthetic stereo images using a generative adversarial network (GAN) to generate a fake image, wherein the fake image corresponds to a photorealistic estimate of one of the synthetic stereo images. A stereo pair of fake images can be processed to form a fake depth map and the fake depth map can be compared to the synthetic depth map using a Siamese one-shot neural network. A deep neural network can be trained to determine an object using one or more of the fake images generated by the GAN and a vehicle can be operated based on the object. The image synthesis engine can generate photorealistic pairs of synthetic stereo images and corresponding synthetic depth maps based on mathematical descriptions of a three-dimensional scene. Each of the photorealistic images from the photorealistic pairs of synthetic stereo images preserves depth and 3D shape constraints. The fake depth map can be formed by calculating stereo disparity between corresponding features from the pair of fake stereo images.

Corresponding features from the pair of synthetic stereo images can be determined by determining edges and textures. Each image in the pair of synthetic stereo images can be processed using the GAN to generate the pair of fake stereo images by modifying data in the fake stereo images to achieve domain adaption by simulating effects of ambient lighting including overcast and dark, and weather conditions including rain, snow, and fog. The GAN can be trained to discriminate between fake stereo images generated by the GAN and real stereo images by training the GAN using real stereo images acquired by the stereo camera. The Siamese one-shot neural network can be trained to test the fake depth map by training the Siamese one-shot neural network using the synthetic depth map. Fake depth map testing can include determining a difference between the fake depth map and the synthetic depth map. The difference between the fake depth map and the synthetic depth map can be input to the GAN during training. The vehicle can be operated based on determining a location of the object with respect to the vehicle, wherein the object can include one or more of a vehicle and a pedestrian. A direction and speed can be determined for the object. The vehicle can be operated based determining a vehicle path based on the location of the object. The object can be determined based on acquiring a video image and inputting to the deep neural network.

Further disclosed is a computer readable medium, storing program instructions for executing some or all of the above method steps. Further disclosed is a computer programmed for executing some or all of the above method steps, including a computer apparatus, programmed to generate a pair of synthetic stereo images and a corresponding synthetic depth map with an image synthesis engine wherein the synthetic stereo images correspond to real stereo images acquired by a stereo camera and the synthetic depth map is a three-dimensional (3D) map corresponding to a 3D scene viewed by the stereo camera and processing each image of the pair of synthetic stereo images using a generative adversarial network (GAN) to generate a fake image, wherein the fake image corresponds to a photorealistic estimate of one of the synthetic stereo images. A stereo pair of fake images can be processed to form a fake depth map and the fake depth map can be compared to the synthetic depth map using a Siamese one-shot neural network. A deep neural network can be trained to determine an object using one or more of the fake images generated by the GAN and a vehicle can be operated based on the object. The image synthesis engine can generate photorealistic pairs of synthetic stereo images and corresponding synthetic depth maps based on mathematical descriptions of a three-dimensional scene. Each of the photorealistic images from the photorealistic pairs of synthetic stereo images preserves depth and 3D shape constraints. The fake depth map can be formed by calculating stereo disparity between corresponding features from the pair of fake stereo images.

The computer can be further programmed to determine corresponding features from the pair of synthetic stereo images by determining edges and textures. Each image in the pair of synthetic stereo images can be processed using the GAN to generate the pair of fake stereo images by modifying data in the fake stereo images to achieve domain adaption by simulating effects of ambient lighting including overcast and dark, and weather conditions including rain, snow, and fog. The GAN can be trained to discriminate between fake stereo images generated by the GAN and real stereo images by training the GAN using real stereo images acquired by the stereo camera. The Siamese one-shot neural network can be trained to test the fake depth map by training the Siamese one-shot neural network using the synthetic depth map. Fake depth map testing can include determining a difference between the fake depth map and the synthetic depth map. The difference between the fake depth map and the synthetic depth map can be input to the GAN during training. The vehicle can be operated based on determining a location of the object with respect to the vehicle, wherein the object can include one or more of a vehicle and a pedestrian. A direction and speed can be determined for the object. The vehicle can be operated based determining a vehicle path based on the location of the object. The object can be determined based on acquiring a video image and inputting to the deep neural network.

Figure 1:
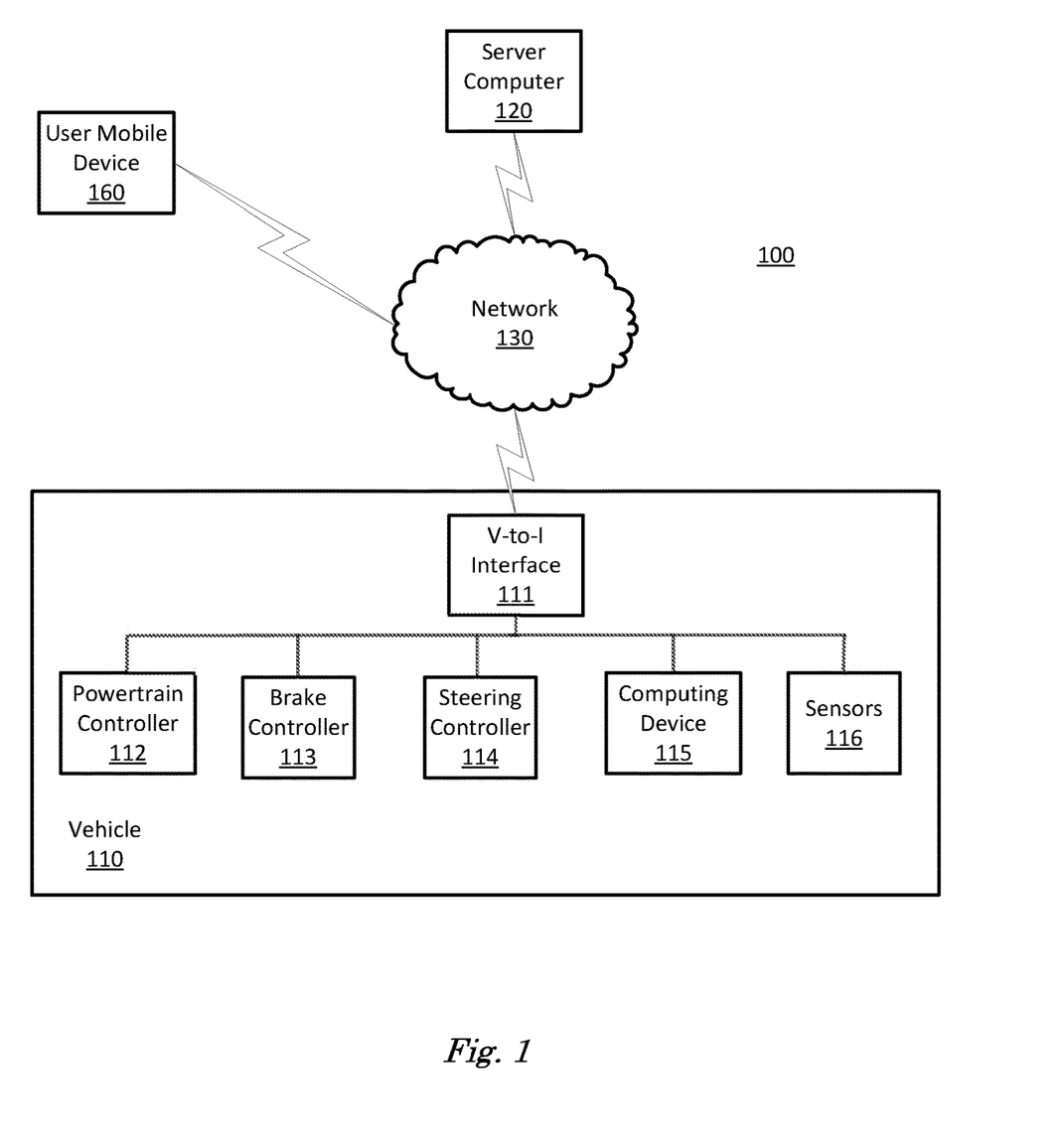
FIG. 1 is a block diagram of an example traffic infrastructure system.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. One or more vehicle 110 computing devices 115 can receive information regarding the operation of the vehicle 110 from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
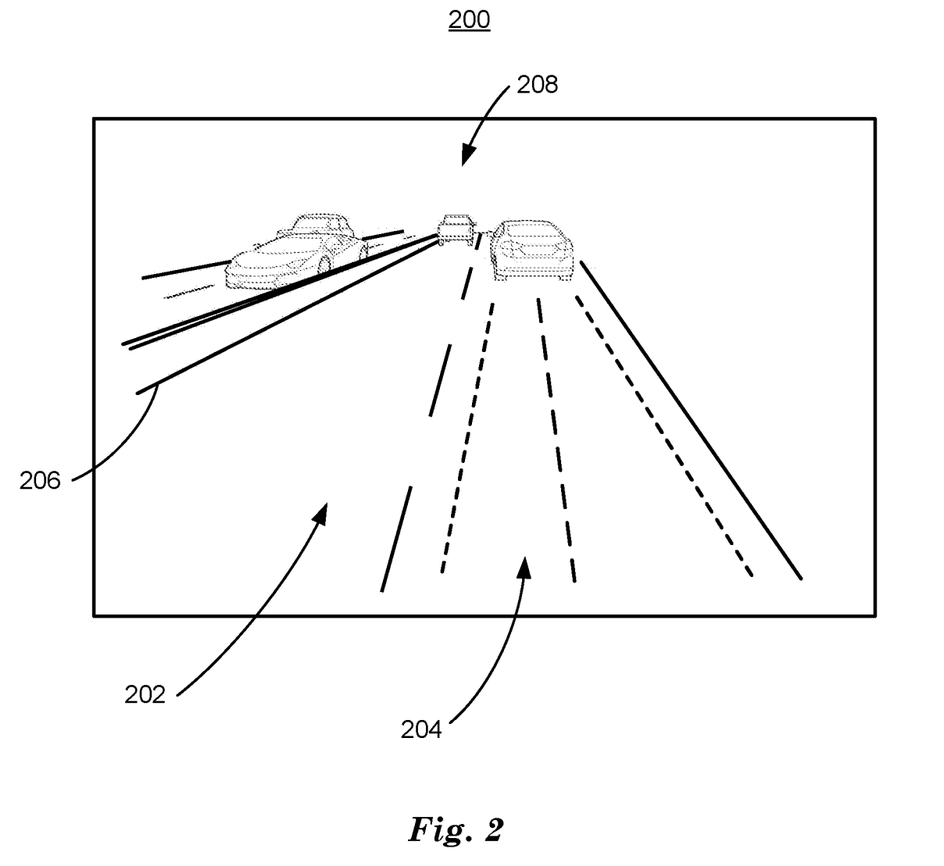
FIG. 2 is a diagram of an example image of a traffic scene.

FIG. 2 is an example diagram of a red-green-blue (RGB) image 200 rendered in black and white to comply with Patent Office regulations. RGB image 200 includes a roadway 202, lane markings 204, a lane barrier 206 and vehicles 208. RGB image 200 can be acquired from a video sensor included in a vehicle 110 and communicated to a computing device 115. Computing device 115 can include a deep neural network (DNN) that inputs an RGB image 200 and outputs data regarding an identity and location of roadway 202, lane markings 204, the lane barrier 206 and vehicle 208 within a field of view of the video sensor. A DNN is a computer software program that uses programmable layers of computational units to detect patterns in input data. A DNN can be trained to identify and locate objects and regions in image data by training the DNN using a plurality of RGB images 200 and corresponding ground truth data. Ground truth data is data describing identity and locations for objects and regions in an RGB image 200 obtained from a source independent of the DNN being trained. For example, identities and locations for objects and regions in an RGB image 200 can be determined by user input, where a user can identify and measure the locations of objects and regions in an RGB image 200 and record the data as ground truth corresponding to the RGB image 200.

Acquiring a large number of RGB images 200 using vehicle 110 video sensors and determining ground truth corresponding to objects and regions in each RGB image 200 by user input can be a time-consuming and difficult task. RGB images 200 and corresponding ground truth can be obtained more efficiently using a rendering process that takes as input a scene description that includes mathematical data corresponding to a three-dimensional (3D) map describing locations and surface reflectance of objects and regions in a scene and a virtual sensor which includes a mathematical description of the field of view of the virtual sensor. The rendering process inputs the scene description and outputs a photorealistic RGB image. "Photorealistic" refers to an RGB image 200 appearing to an observer as if it were acquired with a real-world camera viewing a real-world scene, rather than rendered from scene description and virtual sensor data. Photorealism can be quantified by comparing a photograph of a real world scene acquired with a physical camera with a synthetic rendering of the same scene. The digital images corresponding to the real world photograph and the synthetic rendering can be subtracted on a per-pixel basis and the squared differences summed, for example to determine an overall measure of photorealism. When the summed squared difference between a synthetic rendering and a photograph is less than a user input threshold the synthetic rendering can be determined to be photorealistic. Small summed square differences between a synthetic rendering and a corresponding photograph are highly correlated with a typical observer's opinion that the synthetic rendering appears realistic. Photorealistic rendering can be performed by ray tracing, where a sample of light rays from one or more light sources (lamps, sunlight, etc.)

are traced from the light source as they reflect from surfaces in a 3D map into a location on a virtual sensor plane of a virtual camera to create an RGB image. Tracing a large number of light rays in this fashion can create a synthetic RGB image 200 that appears to an observer to be a realistic photograph of a real scene.

Figure 3:
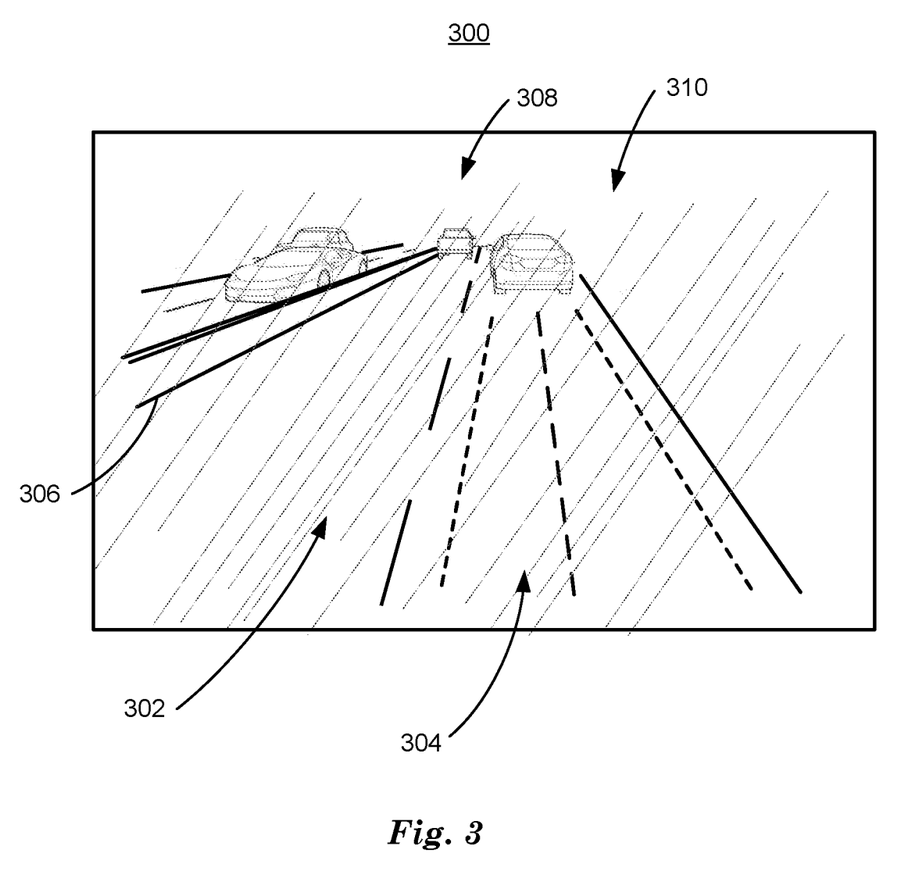
FIG. 3 is a diagram of an example image of a traffic scene.

FIG. 3 is a synthetic RGB image 300 of a traffic scene including a roadway 302, lane markings 304, a lane barrier 306, and vehicles 308. As discussed above in relation to FIG. 2, synthetic RGB image 300 data can be used to train a DNN to identify and locate objects and regions in image data, rendered in black and white to comply with Patent Office regulations. An advantage of using synthetic RGB images 300 includes the ability to generate large numbers of synthetic RGB images 300 corresponding to a large variety of traffic scenes. Large numbers of synthetic RGB images 300 corresponding to a large variety of traffic scenes can be advantageous for training a DNN. The more examples of each class of regions and objects, for example roadways 302 and vehicles 308, that are provided to a DNN in a training dataset, the more robust the DNN will be. A robust, trained DNN can be used by a computing device 115 in a vehicle 110 to determine a vehicle path for vehicle 110 based on predicting future locations of identified and located objects. Future locations of identified and located objects can be determined by tracking the location of an object at one or more time steps and thereby determining a speed and direction of motion for the object, for example. Computing device 115 can determine a vehicle path for vehicle 110 to travel while avoiding a moving object based on determined future locations of the object.

A feature of traffic scenes that can cause the appearance of regions and objects in real and synthetic RGB images to differ in atmospheric effects 310. Atmospheric effects 310 can include precipitation, such as rain, snow, sleet, hail, fog, dust, haze, etc. Similar regions and objects in different RGB images can appear different due to differing atmospheric effects 310 and can prevent a trained DNN from correctly identifying and locating objects, for example. Synthetic RGB image 300 has been modified by the addition of pixel data corresponding to an atmospheric effect 310, in this example rain, illustrated by dotted lines. The addition of an atmospheric effect 310 to synthetic RGB image 300 can permit a DNN to be trained to correctly identify and locate lane markings 304, the lane barrier 306, and vehicles 308 in synthetic RGB image 300 unaffected by changes in appearance of the objects caused by the addition of atmospheric effects 310. Techniques described herein improve the training of a DNN by providing a large number, greater than 1000, for example, of synthetic RGB images 300 modified with a wide variety of atmospheric effects 310 to mimic real world RGB images acquired by vehicle sensors while a vehicle 110 is being operated in the real world.

Training a DNN to successfully identify and locate regions and objects in an RGB image 300 can depend upon the regions and objects in the RGB image 300 being consistent with real world geometry and imaging physics that determine imaging of a scene with a real world camera. Geometry refers to an underlying 3D reflectance map that is used to create the synthetic pair of stereo RGB images and imaging physics refers to the process of forming an image on an imaging sensor by capturing photons from incident illumination. If modification an RGB image 300 by addition of atmospheric effects 310 distorts the real world geometry and imaging physics of the resulting RGB image 300, the modified RGB 300 is not useful for training a DNN, because the training is no longer domain adaptive. Domain adaptive refers to training (adapting) a DNN to successfully accomplish tasks on an expected set of real world input RGB images 300 (the domain). Techniques described herein can avoid problems with domain adaption by testing input synthetic RGB images 300 with added atmospheric effects 310 by creating a pair of synthetic stereo RGB images and a corresponding synthetic depth map, adding atmospheric effects 310 with a generative adversarial network (GAN), creating a second depth map from the processed synthetic stereo RGB images and comparing the second depth map to the synthetic depth map to determine that the processed synthetic stereo RGB images have not distorted the geometry and imaging physics of the synthetic stereo RGB images. A GAN configured to process and test synthetic stereo RGB image pairs is discussed with regard to FIG. 6, below.

Figure 4:
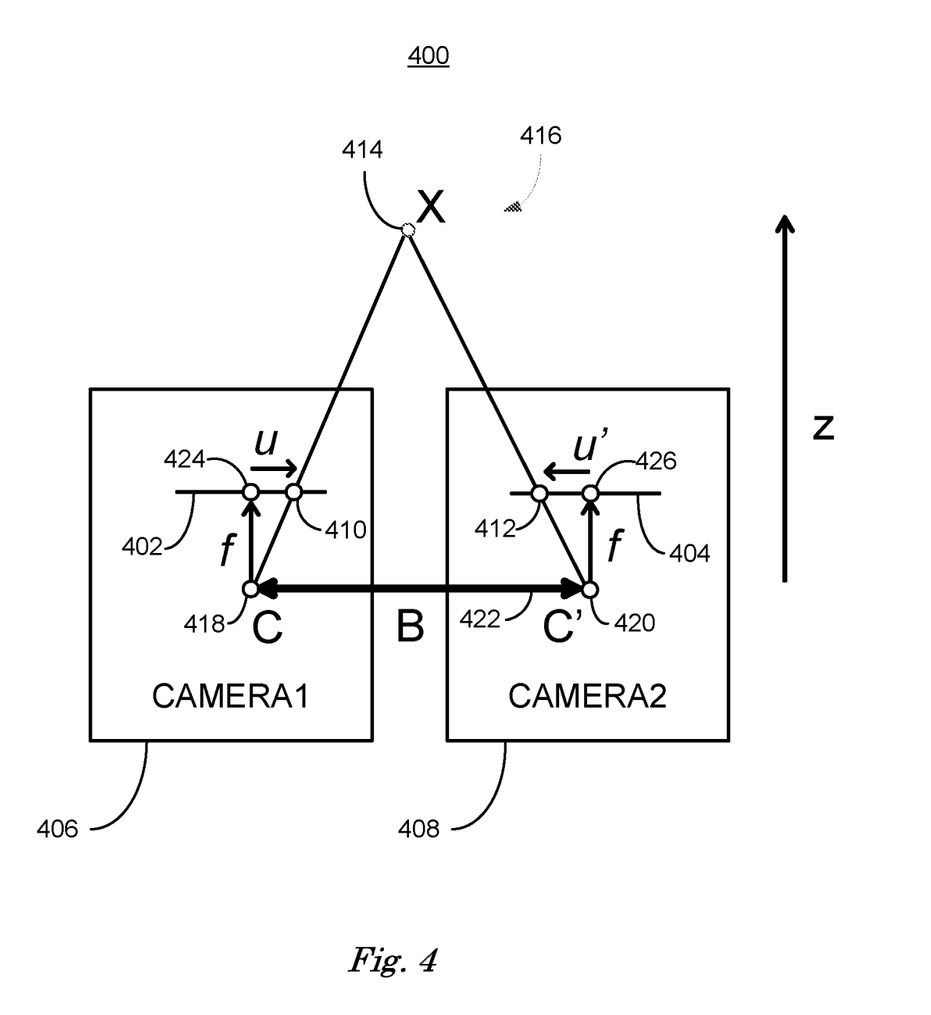
FIG. 4 is a diagram of example stereo disparity calculation.

FIG. 4 is a diagram of example stereo disparity 400. Stereo disparity describes the differences between two stereo images acquired by first and second cameras (CAMERA1, CAMERA2) 406, 408. For example, stereo disparity 400 determines the horizontal distance between the projection points 410, 412 of an object, e.g. point X 414, onto two stereo images 402, 404. FIG. 2 includes a point X 414 in a scene 416 imaged by a pair of stereo cameras first camera 406 and second 408. Point X 414 is projected onto first camera 406 image detector 402 to form a left point 410 and onto second camera 408 image detector 404 to form right point 412. First camera 406 has an optical center C 418 at focal distance f from image detector 402 while second camera 408 has an optical center C' 420 at focal distance f from image detector 404. Optical centers 418, 420 form a baseline B 422. The projection of optical center 418 onto image detector 402 forms left center point 424 and the projection of optical center 420 onto image detector 404 forms right center point 426. The distances u and u' can be determined from the displacements of left point 410 from left center point 424 and right point 412 from right center point 426. Stereo disparity SD, defined as SD=u−u' can be related to a distance Z of point X 414 from optical centers 418, 420 by equation (1):

$$SD = u - u' = \frac{B * f}{Z} \quad (1)$$

The point X 414 can be determined by detecting and identifying a feature in stereo images acquired by first and second cameras 406, 408. Features that can be matched to calculate stereo disparity and thereby range or depth can include visual edges in the stereo image pair, for example. Features can be determined using image processing techniques including edge detection and template matching, where a user input shape can be compared to pixel values in the stereo image pair. Multiple features can be detected, and stereo disparity calculated for each feature pair and interpolated to determine depth. Other techniques, e.g., block matching algorithms, for estimating depth from stereo images include dividing each stereo pair of images into pairs of blocks or windows and matching each pair of windows to determine stereo disparity. Stereo disparity can be used to determine a depth map for a scene 416 viewed by a pair of stereo cameras 406, 408.

Figure 5:
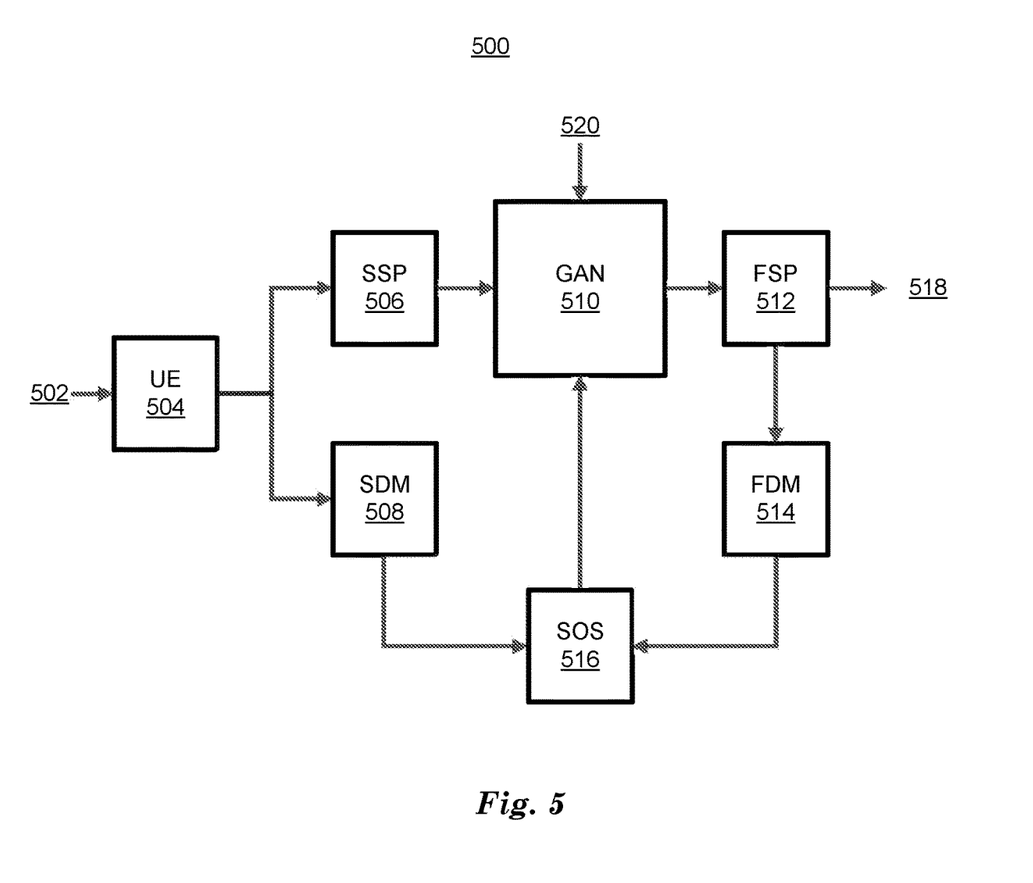
FIG. 5 is a diagram of an example Generative Adversarial Network system.

FIG. 5 is an example GAN system 500 configured to input scene descriptions 502 and output a synthetic image 518 that can be used to train a DNN to identify and locate objects and regions in an image of a scene acquired by sensors 116 included in a vehicle 110. As discussed above in relation to FIG. 3, scene descriptions 502 are computer files that include mathematical data corresponding to regions and objects included in a scene. For example, a scene description 502 can include an element that describes the location and surface appearance of a roadway 302 including the location and appearance of lane markings 304 and a lane barrier 306. Other elements included in the scene description can include vehicles 308 or other objects such as pedestrians and bicyclists, for example. Elements included in a scene description 502 include data that permits rendering software like unreal engine 504 to render the element. Rendering is a graphics technique that traces light rays from user input illumination sources as they are reflected by surfaces determined by an element in a scene description into a lens of a virtual camera which creates an image corresponding to the scene. Rendering can create a photorealistic image of a scene as illuminated by a determined light source. For example, an image of a vehicle illuminated by sunlight at a user input angle and distance from a camera at a user input time of day can be rendered by unreal engine 504.

Unreal engine 504 is a photorealistic rendering process that inputs mathematical data and generates photorealistic output images. Unreal engine 504 is included in a suite of integrated development tools for the design and build of games, simulations, and visualizations available from Epic Games, Inc., www.unrealengine.com, Apr. 30, 2019. In this example, unreal engine 504 inputs a scene description 502 and outputs a pair of synthetic stereo images (SSP) 506 and a corresponding synthetic depth map (SDM) 508. Because the synthetic depth map 508 is determined based on the input scene description 502, the synthetic depth map 508 is ground truth corresponding to the synthetic stereo images 506, e.g., a reconstructed depth map based on stereo disparity in the synthetic stereo images 506 can be compared to the synthetic depth map 508 determined based on the input scene description to determine the accuracy of the stereo disparity calculations.

The synthetic stereo image pairs can be input to GAN 510 to add atmospheric effects to the stereo image pairs 506. A GAN 510 is a deep neural network that can be trained to generate data that corresponds to data from a distribution of data specified by the input. In this example, GAN 510 can receive as input a pair of synthetic stereo images 506 and output a pair of fake stereo images 512 that include atmospheric effects as discussed above in relation to FIG. 3. A GAN 510 includes a generator neural network that generates the fake stereo images 512 and a discriminator neural network that discriminates fake stereo images 512 from real stereo images 520. The output of a GAN 510 is labeled as "fake" because of the manner in which a GAN 510 is trained to determine output results, i.e., outputting fake or synthetic data rather than "real" data from the physical world captured by an image sensor. A GAN 510 can be trained using ground truth that includes real data, for example real stereo images 520 acquired using real world stereo cameras, for example. A discriminator neural network included in GAN 510 is trained to distinguish real stereo images 520 from all other images that are not real stereo images 520, e.g., "fake" stereo images 512. During training, a GAN 510 can be trained to generate fake stereo images 512 that mimic the real stereo images 520 closely enough that the discriminator neural network labels the fake stereo images 512 as real stereo images 520. In this fashion a GAN 510 can be trained to output fake stereo images 512 that have similar pixel data to real stereo images 520 and therefore similar appearance. Therefore, in this example fake stereo images 512 are defined as stereo images that are similar enough in appearance to real stereo images 520 to be determined to be real stereo images by a discriminator neural network. The results output by a discriminator neural network can be tested against real stereo images 520 with the result that that fake stereo images 512 determined to be "real" by a discriminator neural network would have summed square differences with respect to real stereo images 520 that are less than a user input threshold (i.e., user input determines a threshold at which a user cannot tell a difference between real and fake images) and would appear realistic to a typical observer as discussed above in relation to FIG. 2. Real stereo images 520 include real world atmospheric effects acquired by a real world stereo camera and correspond to ground truth used to train the GAN 510. Fake stereo images 512 are output as photorealistic images 518 and can be subsequently used to train a DNN to identify and locate objects and regions in image data including atmospheric effects.

Fake stereo images 512 are also processed using stereo disparity as discussed above in relation to FIG. 4 to form a fake depth map 514. The fake depth map 514 is compared to the synthetic depth map 508 by a Siamese one-shot neural network (SOS) 516. The Siamese one-shot neural network 516 measures distortion introduced into the geometric relationships of features in the fake stereo images 512 introduced by adding atmospheric effects. The output from the Siamese one-shot neural network 516 is output to the GAN 510 to be used at training time to train the GAN 510 to add atmospheric effects that do not adversely affect the geometric relationships of features in the fake stereo images 512 compared to the input synthetic stereo images 506. Training the GAN 510 in this fashion can improve the ability of GAN 510 to generate photorealistic output images that include realistic geometry and correspond to realistic imaging physics. A Siamese one-shot neural network 516 is a convolutional neural network that can be trained using one example of a class of images, for example, and following training recognize other members of the class of images without further training. In this example the Siamese one-shot neural network 516 can be trained using a synthetic depth map 508 and then process a fake depth map 514 to determine whether the synthetic depth map 508 and the fake depth map 514 belong the same class, e.g., whether they correspond to the same pair of stereo images. A Siamese one-shot neural network 516 improves determination of similarity between images over simply subtracting one image from another and summing the squared differences because it provides a more accurate measure of image similarity despite geometric distortions.

Techniques described herein improve training of a DNN to identify and locate regions and objects in vehicle sensor image data by using an unreal engine 504 to render large numbers (>1000) of pairs of synthetic stereo images 506 with corresponding synthetic depth maps. A GAN 510 is used to generate fake stereo images 512 that can be output as photorealistic images 518 with atmospheric effects added. The fake stereo images 512 can be processed to determine a fake depth map 514 that can be compared to a synthetic depth map 508 to verify that the added atmospheric effects do not alter the geometric relationship of features in the fake stereo images 512. The output photorealistic images 518 can be used to train a DNN to identify and locate regions and objects in the output photorealistic images 518 where identifying and locating regions and objects in the output photorealistic images including atmospheric effects can depend upon geometric relationships between features in the output photorealistic images 518.

Figure 6:
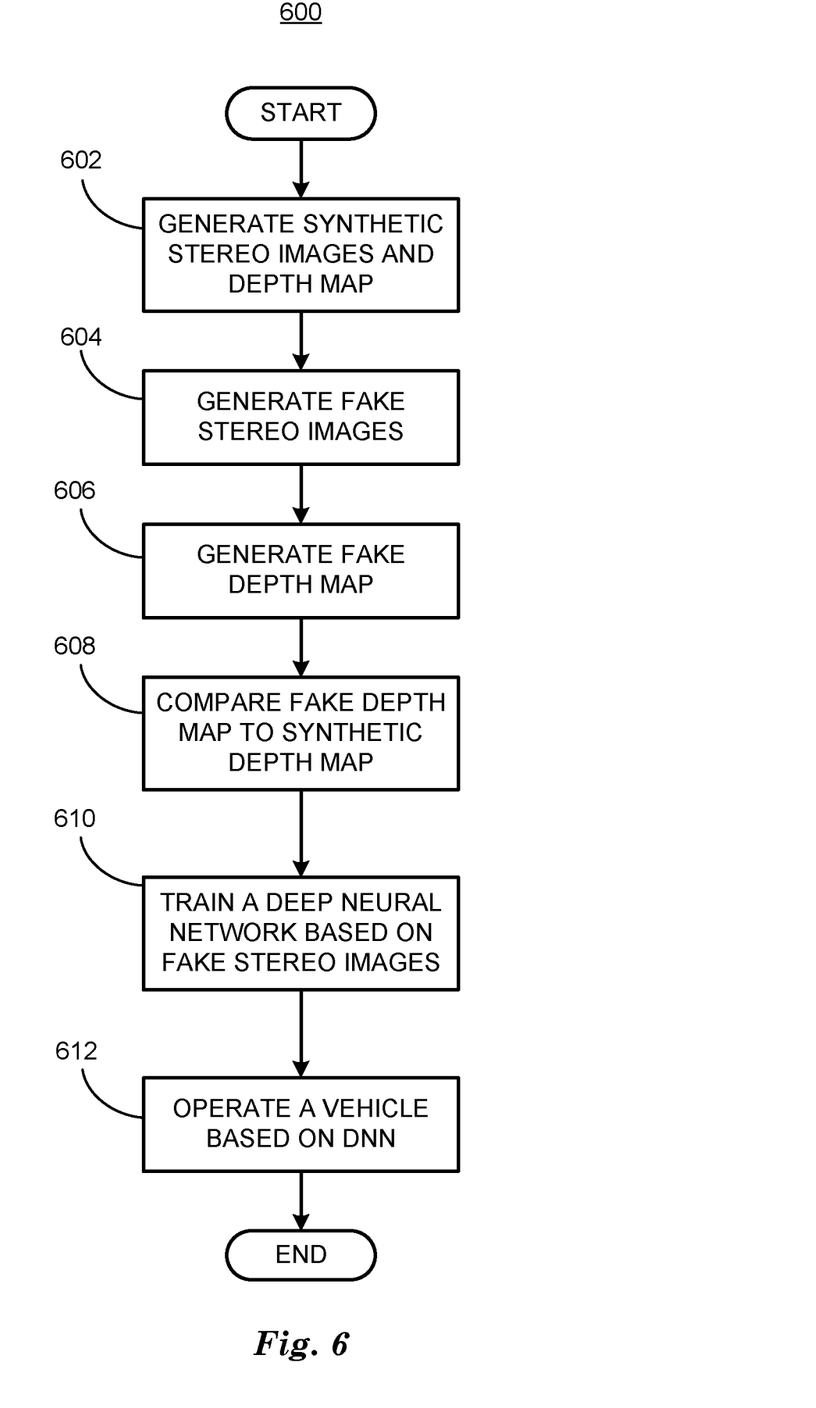
FIG. 6 is a flowchart diagram of a process to generate images for training a deep neural network to operate a vehicle.

FIG. 6 is a diagram of a flowchart, described in relation to FIGS. 1-5, of a process 600 for operating a vehicle based on a trained DNN. Process 700 can be implemented by a processor of computing device, taking as input information from sensors, and executing commands, and outputting object tracking information, for example. Process 600 includes multiple blocks taken in the disclosed order. Process 600 could alternatively or additionally include fewer blocks or can include the blocks taken in different orders.

Process 600 begins at block 602, where a computing device 115 generates a pair of synthetic stereo images and a synthetic depth map based on a scene description that describes regions and objects in terms of geometric shapes and surface textures. An unreal engine 504 inputs a scene description 502 and, using ray tracing, renders a photorealistic pair of synthetic stereo images 506 and a corresponding synthetic depth map 508.

At block 604 computing device 115 inputs the synthetic stereo images 506 and generates a pair of fake stereo images 512 with added atmospheric effects 310 using a trained GAN 510 as discussed above in relation to FIGS. 4 and 5. The atmospheric effects 310 simulate the appearance of real world weather such as rain, snow, sleet, hail, fog, dust, haze, etc. The GAN 510 processes the synthetic stereo image 506 one at a time independently and can output the fake images independently as photorealistic images 518 and combined into pair of fake stereo images 512 corresponding to the input synthetic stereo images 506.

At block 606 the fake stereo images 512 are process using stereo disparity as discussed above in relation to FIG. 4 to determine a fake depth map 514. The fake depth map 514 can be compared to the synthetic depth map 508 from block 602 using a Siamese one-shot neural network 516 to verify the geometric relationship between features included in the fake stereo images 512.

At block 608 the fake stereo images 512 are output as photorealistic images 518 including atmospheric effects to be used for training a DNN to identify and locate regions and objects in image data as discussed above in relation to FIG. 2. A trained DNN can process image data acquired by sensors 116 included in a vehicle 110 or acquired by a stationary video camera, for example. A trained DNN can output regions and objects located in an input image for a variety of tasks related to vehicle operation. For example, moving objects can be located and tracked by acquiring and processing multiple images acquired at successive time steps. Data regarding locations of roadways 202 and lane markings 204 and therefore locations of a vehicle 110 with respect to a roadway can be determined by processing images with a trained DNN. A trained DNN can determine locations, directions and speeds for moving objects including vehicles, pedestrians, and bicycles, for example.

At block 610 the trained DNN can be used to operate a vehicle 110. A computing device 115 included in a vehicle 110 can input image data from a sensor 116 to a trained DNN. The DNN can output identity and location information for regions and objects in an image, for example a roadway 302, lane markings 304, lane barriers 306 and vehicles 308. By tracking objects over successive time periods, future locations of moving objects can be predicted. A vehicle path can be determined that avoids moving objects based on the predicted future locations of moving objects. Computing device can the command vehicle powertrain, steering and brakes via controllers 112, 113, 114 to operate vehicle 110 along the vehicle path. Following block 610 process 600 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Python, Julia, SCALA, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The invention claimed is:

1. A computer, comprising a processor; and
a memory, the memory including instructions to be executed by the processor to:
generate a pair of synthetic stereo images with an image synthesis engine wherein the synthetic stereo images correspond to a first depth map, which includes a three-dimensional (3D) map corresponding to a 3D scene description ;
process each image of the pair of synthetic stereo images independently using a generative adversarial network (GAN) to generate a pair of stereo fake images,
process the pair of stereo fake images to form a second depth map;
train the GAN by comparing the second depth map to the first depth map using a Siamese one-shot neural network to verify geometric relationships between the pair of stereo fake images;
train a deep neural network to determine an object using one or more of the pair of stereo fake images generated by the GAN; and
operate a vehicle based on the object.

2. The computer of claim 1, wherein the image synthesis engine generates photorealistic pairs of synthetic stereo images and corresponding synthetic depth maps based on mathematical descriptions of a three-dimensional scene.

3. The computer of claim 1, the instructions further including instructions to form the fake depth map by calculating stereo disparity between corresponding features from the pair of fake stereo images.

4. The computer of claim 3, the instructions further including instructions to determine corresponding features from the pair of synthetic stereo images by determining edges and textures.

5. The computer of claim 1, the instructions further including instructions to process each image of the pair of synthetic stereo images independently using the GAN to generate the pair of fake stereo images by modifying data to the fake stereo images to achieve domain adaptation by simulating effects of ambient lighting including overcast and dark, and weather conditions including rain, snow, and fog.

6. The computer of claim 1, the instructions further including instructions to train the GAN to discriminate between fake stereo images generated by the GAN and real stereo images by training the GAN using real stereo images acquired by the stereo camera.

7. The computer of claim 1, the instructions further including instructions to train the Siamese one-shot neural network to test the fake depth map by training the Siamese one-shot neural network using the synthetic depth map.

8. The computer of claim 7, wherein testing the fake depth map includes determining a difference between the fake depth map and the synthetic depth map.

9. The computer of claim 1, the instructions further including instructions to operate the vehicle based on determining a location of the object with respect to the vehicle, wherein the object can include one or more of a vehicle and a pedestrian.

10. The computer of claim 9, the instructions further including instructions to operate the vehicle based determining a vehicle path based on the location of the object.

11. A method, comprising:
generating a pair of synthetic stereo images with an image synthesis engine wherein the synthetic stereo images correspond to depth map, which includes a three-dimensional (3D) map corresponding to a 3D scene;
processing each image of the pair of synthetic stereo images independently using a generative adversarial network (GAN) to generate a pair of stereo fake images;
processing the pair of stereo fake images to form a second depth map;
train the GAN by comparing the second depth map to the first depth map using a Siamese one-shot neural network;
training a deep neural network to determine an object using one or more of the pair of stereo fake images generated by the GAN; and
operating a vehicle based on the object.

12. The method of claim 11, wherein the image synthesis engine generates photorealistic pairs of synthetic stereo images and corresponding synthetic depth maps based on mathematical descriptions of a three-dimensional scene.

13. The method of claim 11, further comprising forming the fake depth map by calculating stereo disparity between corresponding features from the pair of fake stereo images.

14. The method of claim 13, further comprising determining corresponding features from the pair of synthetic stereo images by determining edges and textures.

15. The method of claim 11, further comprising processing each image in the pair of synthetic stereo images using the GAN to generate the pair of fake stereo images by modifying data in the fake stereo images to achieve domain adaption by simulating effects of ambient lighting including overcast and dark, and weather conditions including rain, snow, and fog.

16. The method of claim 11, further comprising training the GAN to discriminate between fake stereo images generated by the GAN and real stereo images by training the GAN using real stereo images acquired by the stereo camera.

17. The method of claim 11, further comprising training the Siamese one-shot neural network to test the fake depth map by training the Siamese one-shot neural network using the synthetic depth map.

18. The method of claim 17, wherein testing the fake depth map includes determining a difference between the fake depth map and the synthetic depth map.

19. The method of claim 11, further comprising operating the vehicle based on determining a location of the object with respect to the vehicle, wherein the object can include one or more of a vehicle and a pedestrian.

20. The method of claim 19, further comprising operating the vehicle based determining a vehicle path based on the location of the object.

* * * * *

UNITED STATES PATENT AND TRADEMARK OFFICE
CERTIFICATE OF CORRECTION

PATENT NO. : 10,949,684 B2
APPLICATION NO. : 16/406466
DATED : March 16, 2021
INVENTOR(S) : Nikita Jaipuria et al.

Page 1 of 1

It is certified that error appears in the above-identified patent and that said Letters Patent is hereby corrected as shown below:

In the Claims

| | |
|---|---|
| Column 13, Claim 1, Line 12: | delete the blank space after "description"; |
| Column 13, Claim 1, Line 15: | change "," to --;--. |
| Column 14, Claim 10, Line 2: | insert --on-- after "based" (first occurrence). |
| Column 14, Claim 11, Line 16: | change "train" to --training--. |
| Column 14, Claim 20, Line 58: | insert --on-- after "based" (first occurrence). |

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*